United States Patent
Harris et al.

(10) Patent No.: US 9,692,681 B2
(45) Date of Patent: Jun. 27, 2017

(54) LINK SPEED FLUCTUATION REDUCTION

(75) Inventors: John Harris, Glenview, IL (US);
Philipp Frank, Madrid (ES)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 257 days.

(21) Appl. No.: 14/402,886

(22) PCT Filed: Jul. 20, 2012

(86) PCT No.: PCT/US2012/047548
§ 371 (c)(1),
(2), (4) Date: Nov. 21, 2014

(87) PCT Pub. No.: WO2014/014474
PCT Pub. Date: Jan. 23, 2014

(65) Prior Publication Data
US 2015/0085660 A1 Mar. 26, 2015

(51) Int. Cl.
*H04L 1/00* (2006.01)
*H04L 12/26* (2006.01)
(Continued)

(52) U.S. Cl.
CPC ............ *H04L 43/16* (2013.01); *H04L 1/0002* (2013.01); *H04L 47/10* (2013.01);
(Continued)

(58) Field of Classification Search
CPC ....... H04L 1/0002; H04L 43/16; H04L 47/10; H04L 47/2416; H04L 47/22; H04L 47/25;
(Continued)

(56) References Cited

U.S. PATENT DOCUMENTS 6,310,857 B1    10/2001   Duffield et al.
2002/0136298 A1  9/2002   Anantharamu et al.
(Continued)

FOREIGN PATENT DOCUMENTS

EP    2 658 167 A1    10/2013
WO    2012/079236 A1   6/2012

OTHER PUBLICATIONS

International Search Report and Written Opinion dated Sep. 28, 2012 corresponding to International Patent Application No. PCT/US2012/047548.
(Continued)

*Primary Examiner* — Jutai Kao
(74) *Attorney, Agent, or Firm* — Squire Patton Boggs (US) LLP

(57) ABSTRACT

Link speed fluctuation reduction can be useful in a variety of communication systems. Such smoothing may have various benefits and may be achieved in various ways. For example, a policy and charging rules function can be leveraged to avoid repeated transfers of a same section of over-the-top video. A method can include detecting, for a link, a link traffic condition above a predetermined threshold. The method can also include estimating link speed to obtain an initial link speed value. When the detected link traffic condition is above a predetermined threshold, the method can further include limiting fluctuation of the link speed to within a threshold amount of the initial link speed value. The method can additionally include periodically re-estimating the recently achieved link speed as an updated link speed value and limiting the fluctuation based on the updated link speed value.

20 Claims, 6 Drawing Sheets

(51) Int. Cl.
    *H04W 28/02*     (2009.01)
    *H04L 12/853*    (2013.01)
    *H04L 12/801*    (2013.01)

(52) U.S. Cl.
    CPC ..... *H04L 47/2416* (2013.01); *H04W 28/0231* (2013.01); *H04W 28/0268* (2013.01)

(58) Field of Classification Search
    CPC ......... H04W 28/0231; H04W 28/0268; H04W 28/18; H04W 28/22
    See application file for complete search history.

(56)              References Cited

U.S. PATENT DOCUMENTS

| | | |
|---|---|---|
| 2004/0240390 A1 | 12/2004 | Seckin |
| 2006/0120312 A1 | 6/2006 | Yamauchi et al. |
| 2009/0046666 A1* | 2/2009 | Huoviala .............. H04W 28/22 370/335 |
| 2010/0020812 A1 | 1/2010 | Nakamura et al. |
| 2010/0027464 A1 | 2/2010 | Luo et al. |
| 2011/0252123 A1 | 10/2011 | Sridhar et al. |
| 2011/0310735 A1* | 12/2011 | Karagiannis .......... H04L 43/045 370/232 |

OTHER PUBLICATIONS

Gamze Seckin, et al.; "Challenges of Wireless Media Streaming"; Internet Citation; XP-002238110; 5 pages.
European Search Report application No. 15152511.0 dated Oct. 9, 2015.

\* cited by examiner

LINK SPEED FLUCTUATION REDUCTION

BACKGROUND

Field

Link speed fluctuation reduction can be useful in a variety of communication systems. Such smoothing may have various benefits and may be achieved in various ways. For example, a policy and charging rules function can be leveraged to avoid repeated transfers of a same section of over-the-top video.

Description of the Related Art

When wireless link speed changes dramatically and frequently, the system can repeatedly download the same section of video with different compression levels generating for example an extra 50% additional overhead. There is value in mechanisms for avoiding this additional overhead, especially when these mechanisms can be implemented in a standards-based environment.

It has been noted that using default hypertext transfer protocol (HTTP) adaptive streaming (HAS) parameters can lead to panic drops and variations in the rate of data streaming. Moreover, potentially available bandwidth may not be fully used, which may reduce the average quality level.

SUMMARY

According to certain embodiments, a method includes detecting, for a link, a link traffic condition above a predetermined threshold. The method also includes estimating link speed to obtain an initial link speed value. When the detected link traffic condition is above a predetermined threshold, the method further includes limiting fluctuation of the link speed to within a threshold amount of the initial link speed value. The method additionally includes periodically re-estimating the recently achieved link speed as an updated link speed value and limiting the fluctuation based on the updated link speed value.

In certain embodiments, an apparatus includes at least one processor; and at least one memory including computer program code. The at least one memory and the computer program code are configured to, with the at least one processor, cause the apparatus at least to detect, for a link, a link traffic condition above a predetermined threshold. The at least one memory and the computer program code are also configured to, with the at least one processor, cause the apparatus at least to estimate link speed to obtain an initial link speed value. When the detected link traffic condition is above a predetermined threshold, the at least one memory and the computer program code are further configured to, with the at least one processor, cause the apparatus at least to limit fluctuation of the link speed to within a threshold amount of the initial link speed value. The at least one memory and the computer program code are additionally configured to, with the at least one processor, cause the apparatus at least to periodically re-estimate the recently achieved link speed as an updated link speed value and limit the fluctuation based on the updated link speed value.

An apparatus, according to certain embodiments, includes detecting means for detecting, for a link, a link traffic condition above a predetermined threshold. The apparatus also includes estimating means for estimating link speed to obtain an initial link speed value. The apparatus further includes limiting means for limiting fluctuation of the link speed to within a threshold amount of the initial link speed value when the detected link traffic condition is above a predetermined threshold. The apparatus additionally includes updating means for periodically re-estimating the link speed as an updated link speed value and limiting the fluctuation based on the updated link speed value.

A non-transitory computer readable medium is, in certain embodiments, encoded with instructions that, when executed in hardware, perform a process. The process includes detecting, for a link, a link traffic condition above a predetermined threshold. The process also includes estimating link speed to obtain an initial link speed value. When the detected link traffic condition is above a predetermined threshold, the process further includes limiting fluctuation of the link speed to within a threshold amount of the initial link speed value. The process additionally includes periodically re-estimating the recently achieved link speed as an updated link speed value and limiting the fluctuation based on the updated link speed value.

BRIEF DESCRIPTION OF THE DRAWINGS

For proper understanding of the invention, reference should be made to the accompanying drawings, wherein.

DETAILED DESCRIPTION

As noted above, wireless link speed changes can result in significant additional overhead. Certain approaches reduce, or avoid the production of, such overhead. For example, certain approaches have a base station, such as eNode B (eNB), feature-rich scheduler. Such an approach may directly avoid the dramatic changes which can produce overhead, because such an approach can be based on information that the flow is a suitable flow, such as a video flow. Moreover, in certain embodiments there can be a policy and charging rules function (PCRF) based mechanism for avoiding this additional overhead.

Thus, certain embodiments address a situation in which a wireless link speed is acceptable for an adaptive application, such as over-the-top (OTT)/video over HTML. However, the link speed may be changing sufficiently rapidly that it creates problematic effects. For example, the variability can result in repeated downloads of the same section of a video with different compression levels, resulting in an extra 50% additional download traffic. Various embodiments address this effect in various ways.

Figure 1:
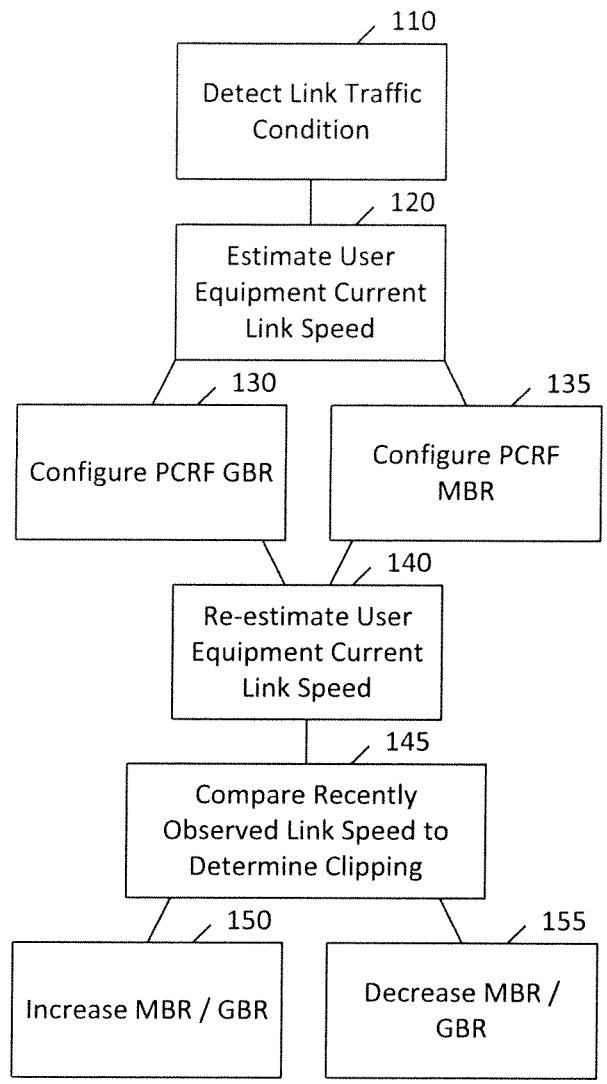
FIG. 1 illustrates a method of reducing redundancy within video over HTML according to certain embodiments.

For example, FIG. 1 illustrates a method of reducing redundancy within video over HTML according to certain embodiments. As shown in FIG. 1, at 110, the communication element can detect a link traffic condition, such as greater than a threshold amount of at least one of repeated transfers of the same section of video, for example with different levels of compression; user equipment (UE) mobility; or variability of link speed or system loading.

Then, at 120, the communication element can estimate the UE current link speed and, at 130, can configure the PCRF guaranteed bit rate (GBR) to be a threshold amount lower than the recently achieved link speed, but not lower than the minimum video bit rate compression level, wherein this minimum bit rate is a minimum bit rate tolerable by the application on a longer timescale. For example, if the application is a video and the video cannot be compressed below 0.5 Mb per second, then the longer timescale minimum bit rate is 0.5 Mbps. This longer timescale minimum bit rate is in contrast to the GBR value, which is the minimum bit rate currently allowed by the dedicated bearer. This GBR value, according to certain embodiments, can be incrementally reduced by smaller amounts, but is not reduced below some true/longer timescale minimum bit rate value. Alternatively, in addition or alternatively, at 135 the communication element can configure the PCRF maximum bit rate (MBR) to be a threshold amount higher than the recently achieved link speed.

After a threshold time interval, at 140, the communication element can re-estimate the UE link speed. At 145, the communication element can compare the recently observed link speed to the currently configured GBR/MBR to determine if the recently observed link speed is consistently clipping within the high or low end of the range allowed by the currently configured dedicated bearer. If, for example, the re-estimated speed is significantly closer to the MBR, than to the GBR, at 150 the GBR and MBR rates can both be increased through the PCRF. Alternatively, if the re-estimated speed is significantly closer to the configured GBR, then the GBR and MBR can both be decreased through the PCRF at 155, while the GBR can be set not lower than the longer timescale minimum bit rate.

The communication element can be a network element within the wireless network, such as a media optimizer, a browsing gateway, or a content aware network enabling gateway. Alternatively, the communication element can be a user equipment. For example, the UE operating system can initiate quality of service (QoS) rate changes through the PCRF as described herein.

Figure 2:
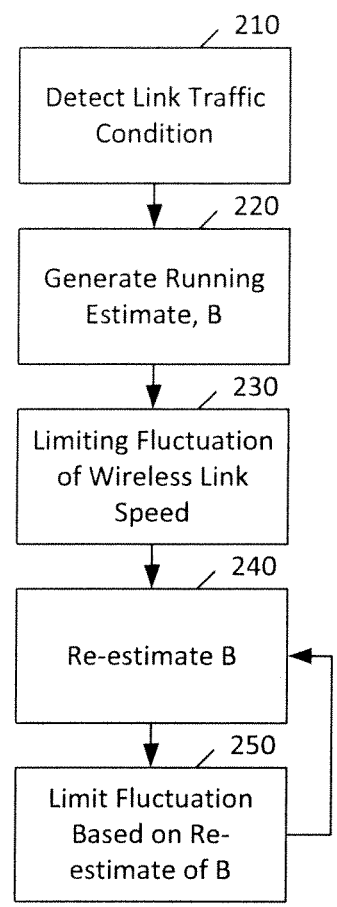
FIG. 2 illustrates a method of limiting the rate at which the wireless link speed can change, according to certain embodiments.

FIG. 2 illustrates a method of limiting the rate at which the wireless link speed can change, according to certain embodiments. The method may provide better service to adaptive applications. The method can include, at 210, detecting a link traffic condition. The method can also include, at 220, generating a running estimate of the video user's recent current wireless link speed $B_i$ at time i. The method can include, at 230, limiting the fluctuation in the wireless link speed to be within a threshold amount of $B_i$.

The method can further include, after a predetermined time interval at time i+1, at 240, re-estimating the value of $B_{i+1}$. This can be followed, at 250, by limiting the fluctuation in the wireless link speed to be within a threshold amount of $B_{i+1}$. After a next predetermined time interval, the re-estimation and limitation can be repeated.

This method may be conditioned on the application being detected to be of a particular type, such as adaptive streaming, or an application type which was previously detected to generate repeated requests/downloads of the same section of content with multiple different compression levels. Moreover, the method may be conditioned on the rate of repeated requests/downloads of the same section of content with multiple different compression levels is found to exceed a threshold. Likewise, the method can be conditioned on the user's mobility being found to exceed some threshold. Similarly, the method can be conditioned on the wireless link speed estimate being found to have variance greater than a threshold.

Limiting the fluctuation in the wireless link speed to be within a threshold amount of $B_i$ can include establishing a dedicated bearer. Establishing the dedicated bearer can be performed by a communication element through PCRF messaging, wherein the GBR and MBR parameters are a fixed percentage below and above $B_i$.

Alternatively, the establishing the dedicated bearer can be performed by signaling down to an eNB indicating that this is a special limited variability session whose average wireless link speed should not change more than a threshold percentage over each given time interval. Likewise, the establishing the dedicated bearer can be performed by signaling through PCRF indicating that this is a special limited variability session whose average wireless link speed should not change more than a threshold percentage over each given time interval. Similarly, the establishing the dedicated bearer can be performed by signaling through PCRF indicating that this is a special limited variability session whose QoS bit rate should be progressively reduced and a staircase fashion over the next time interval. This may be appropriate where, for example, the UE is anticipated to enter a significantly lower throughput wireless system.

The communication element can be a network element within the wireless network such as a media optimizer, browsing gateway, or content aware network enabling gateway. Alternatively, the communication element can be the UE. For example, the UE operating system can initiate QoS rate changes through the PCRF.

Certain embodiments can allow a user's link speed to vary, but within a more narrow window so that the wireless link speed perceived does not change dramatically. This may also reduce the number of dedicated bearer rate changes, because as long as the user's link speed varies within some range no PCRF messaging is required.

Additionally, this does not require a content aware network enabling gateway (CAN-EG) or radiometrics as the browsing gateway can monitor to see if the wireless link speed is very close to the MBR, in which case it can adjust the GBR and MBR to be higher. Alternatively, if the wireless link speed is very close to the GBR, in which case it should adjust the GBR and MBR to be lower, but not lower than Z, where Z is the minimum bit rate that the browsing gateway can possibly produce for the video. That minimum may be, for example, 0.5 Mb per second, for a video which can be self-adaptive within range, such as between 0.5 Mbps and 2 Mbps.

GBR can be used for video and can be periodically updated based on an estimate of the recent link speed given the UE's recent link speed. When radio conditions change, the approach can only allow the GBR and MBR rates to change a limited amount over any given time interval.

For example, the maximum bit rate and the guaranteed bit rate can be set about 20% above and below, respectively, the recently achieved wireless link speed. Then the guaranteed bit rate and maximum bit rate can be periodically adjusted based on the current observed wireless link speed. This can allow the user's link speed to vary, but within a more narrow bit rate window over a shorter time interval. Thus, the wireless link speed perceived may not change dramatically over a short interval, but can change significantly over longer time intervals. This may also reduce the number of dedicated bearer rate changes, because as long as the user's link speed varies within the limited range, no PCRF messaging is required.

Thus, limiting the fluctuation based on the updated link speed can include, for example, limiting the fluctuation to within a second threshold (or a predetermined amount) of the updated link speed value.

Certain embodiments may have various advantages. For example, certain embodiments may avoid repeat transfers by reducing the amount of variability in the wireless link speed. Moreover, certain embodiments may avoid repeat transfers by reducing the amount of variability in the wireless link speed, such as when GBR rate changes, each change is a relatively small amount per transition, compared to the previous GBR value. Certain embodiments may specifically avoid this additional overhead in a standards-based environment. Furthermore, certain embodiments may improve user experience by limiting the rate at which the video quality fluctuates, while still enabling the application to gradually adapt to changing wireless radio frequency (RF) conditions. This gradual adaptation may be performed without direct knowledge of the RF conditions by monitoring the recently achieved rate relative to the configured maximum bit rate and guaranteed bit rate.

Figure 3:
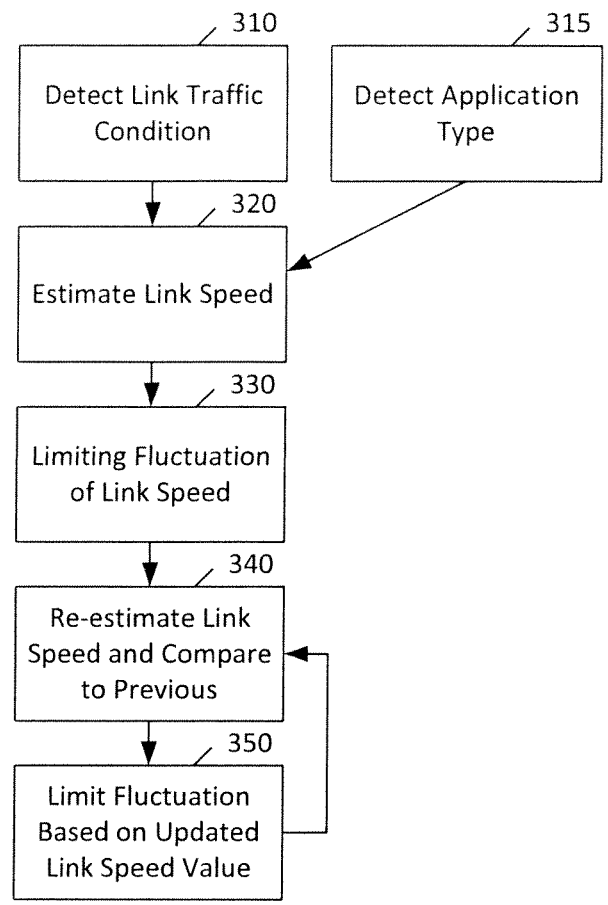
FIG. 3 illustrates a method according to certain embodiments.

FIG. 3 illustrates a method according to certain embodiments. As shown in FIG. 3, a method can include, at 310, detecting, for a link, a link traffic condition above a predetermined threshold. Detecting the link traffic condition can include detecting at least one of repeated transfers of a same section of video, detecting user equipment mobility, or detecting variability of link speed or system loading. The method can also include, at 315, detecting, for the link, an application type.

The method can also include, at 320, estimating link speed to obtain an initial link speed value when the detected link traffic condition is above a predetermined threshold. The estimating can be configured to be performed only when the application type corresponds to a predetermined type. For example, in certain embodiments the estimating is performed only when the application type corresponds to adaptive streaming. In addition or alternatively, the estimating or other steps can be configured to be performed only when a user equipment device type corresponds to a predetermined type, such as a device running a particular operating system or being run on a particular hardware type.

The method can further include, at 330, limiting fluctuation of the link speed to within a threshold amount of the initial link speed value. The method can additionally include, at 340, periodically re-estimating the recently achieved link speed as an updated link speed value and comparing the recently achieved link speed to the existing link speed limitation values and, at 350, limiting the fluctuation based on the updated link speed value.

The limiting of the fluctuation can include establishing a dedicated bearer. The establishing the dedicated bearer can include policy and charging rules function messaging, wherein at least one maximum bit rate parameter is a fixed percentage above that necessary to provide the initial link speed value. The establishing the dedicated bearer can also or alternatively include policy and charging rules function messaging, wherein at least one guaranteed bit rate parameter is a fixed percentage below that necessary to provide the initial link speed value.

At least one of a first threshold amount, such as the threshold amount for a maximum bit rate, a second threshold amount for a guaranteed bit rate, and the fixed percentage amounts can depend upon the value of the application type. Thus, for example, certain video applications may be more tolerant of wireless link speed changes than others. Likewise, certain gaming applications may have more or less sensitivity to link speed changes than other applications like video or adaptive bit rate voice.

The fixed percentage amount can be further decreased in response to detecting repeated transfers of the same section of media in the previous time interval in the presence of the previous fixed percentage amount. For example, if the "distance" between the maximum bit rate and the guaranteed bit rate has a first value in the first time interval, and during this time interval repeated transfers are (still) detected, then the distance (or fixed percentage) between the maximum bit rate and the guaranteed bit rate can be further reduced in the next time interval.

The establishing of the dedicated bearer can include policy and charging rules function messaging. Thus, for example, the guaranteed bit rate parameter and the maximum bit rate parameter can both be increased when the recently achieved link speed is within a threshold percentage of the current maximum bit rate parameter. Moreover, the guaranteed bit rate parameter and the maximum bit rate parameter can both be decreased when the recently achieved link speed is within a threshold percentage of the current guaranteed bit rate parameter.

The establishing of the dedicated bearer can include signaling down to a base station indicating that the link corresponds to a special limited variability session whose average link speed is not to change more than a threshold percentage over each given time interval. The establishing of the dedicated bearer can also or alternatively include signaling through a policy and charging rules function indicating that the link corresponds to a special limited variability session whose average link speed is not to change more than a threshold percentage over each given time interval.

The establishing of the dedicated bearer can include signaling through a policy and charging rules function indicating that the link corresponds to a special limited variability session whose quality of service bit rate is to be progressively reduced in a staircase fashion over a next time interval.

Figure 4:
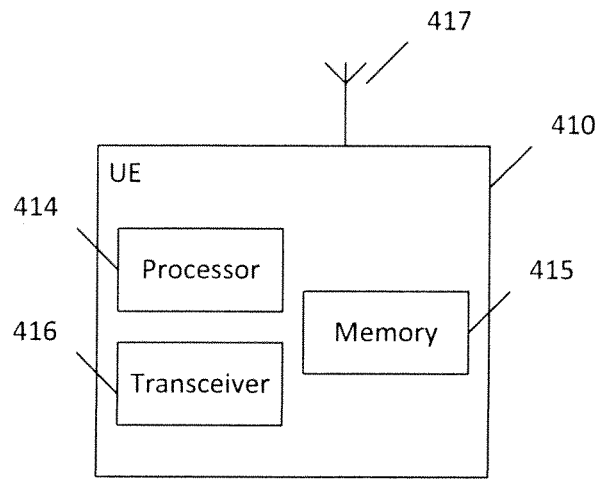
FIG. 4 illustrates a system according to certain embodiments of the invention.
Figure 4:
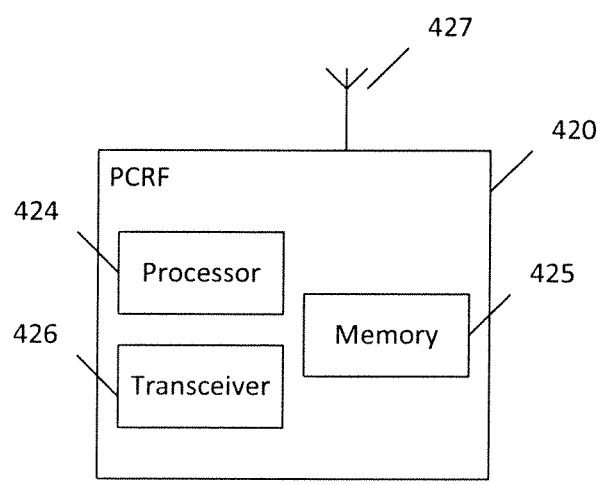

FIG. 4 illustrates a system according to certain embodiments of the invention. In one embodiment, a system may include several devices, such as, for example, user equipment 410 and PCRF 420. Each of these devices may include at least one processor, respectively indicated as 414 and 424. At least one memory is provided in each device, and indicated as 415 and 425, respectively. The memory may include computer program instructions or computer code contained therein. Transceivers 416 and 426 are provided, and each device may also include an antenna, respectively illustrated as 417 and 427. Other configurations of these devices, for example, may be provided. For example, user equipment 410 and PCRF 420 may be configured for wired communication, rather than wireless communication, and in such a case antennas 417 and 427 would illustrate any form of communication hardware, without requiring a conventional antenna.

Transceivers 416 and 426 can each, independently, be a transmitter, a receiver, or both a transmitter and a receiver, or a unit or device that is configured both for transmission and reception.

Processors 414 and 424 can be embodied by any computational or data processing device, such as a central processing unit (CPU), application specific integrated circuit (ASIC), or comparable device. The processors can be implemented as a single controller, or a plurality of controllers or processors.

Memories 415 and 425 can independently be any suitable storage device, such as a non-transitory computer-readable medium. A hard disk drive (HDD), random access memory (RAM), flash memory, or other suitable memory can be used. A non-transitory medium can be a medium that is not a transitory propagated signal. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as user equipment 410 and PCRF 420, to perform any of the processes described above (see, for example, FIGS. 1-3). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 4 illustrates a system including a user equipment 410 and PCRF 420, embodiments of the invention may be applicable to other configurations, and configurations involving additional elements, as described herein.

Figure 5:
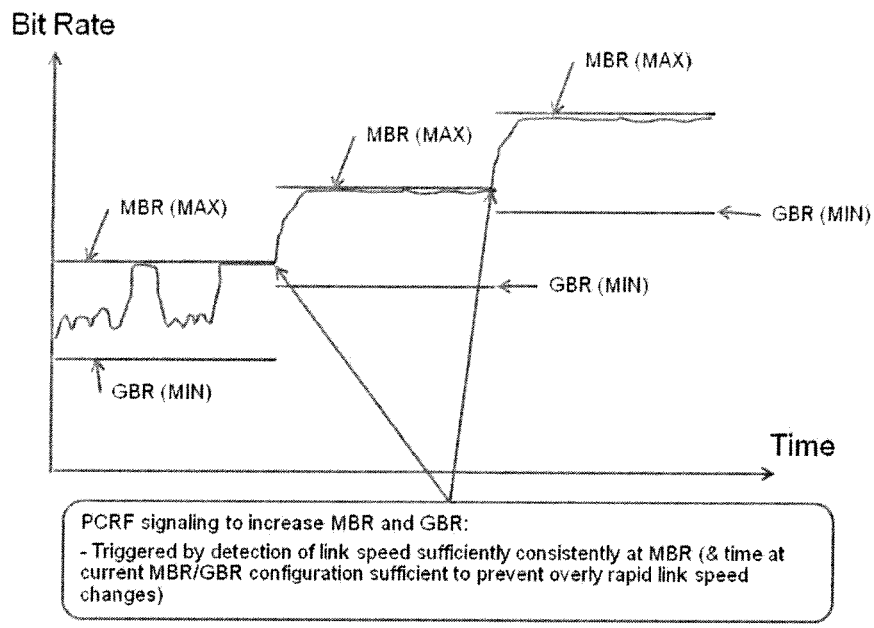
FIG. 5 illustrates PCRF based GBR/MBR limited rate of wireless link speed improvement to avoid thrashing, according to certain embodiments.

FIG. 5 illustrates PCRF based GBR/MBR limited rate of wireless link speed improvement to avoid thrashing, according to certain embodiments. As shown in FIG. 5, PCRF signaling can be used to increase MBR and GBR. This increase can be triggered by detection of link speed that is sufficiently consistently at MBR, and the time at current GBR/MBR configuration is sufficient to prevent overly rapid link speed changes.

Figure 6:
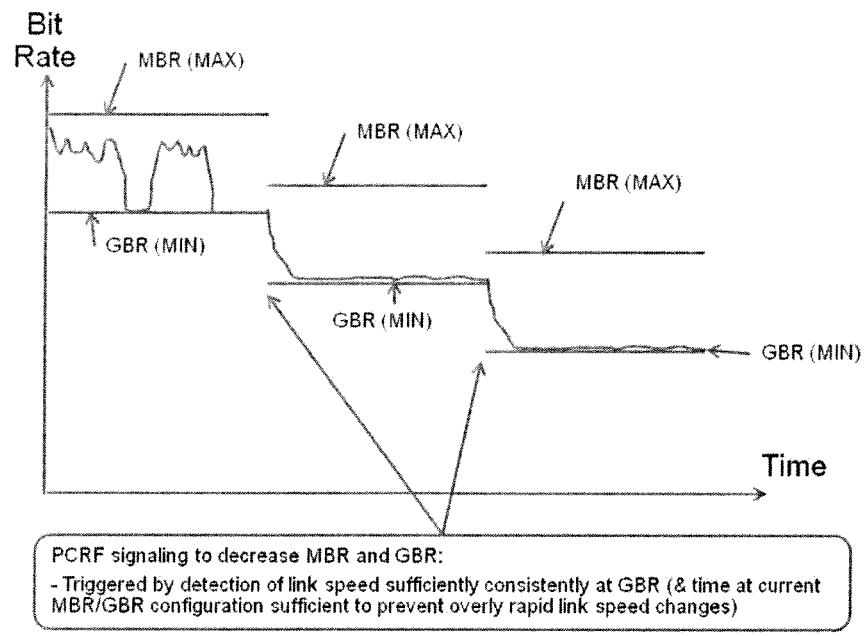
FIG. 6 illustrates PCRF based GBR/MBR limited rate of wireless link speed degradation to avoid thrashing, according to certain embodiments.

FIG. 6, on the other hand, illustrates PCRF based GBR/MBR limited rate of wireless link speed degradation to avoid thrashing, according to certain embodiments. As shown in FIG. 6, PCRF signaling can be used to decrease MBR and GBR. This decrease can be triggered by detection of link speed that is sufficiently consistently at GBR, and the time at current GBR/MBR configuration is sufficient to prevent overly rapid link speed changes.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   detecting, for a link, a link traffic condition above a predetermined threshold;
   estimating link speed to obtain an initial link speed value; and
   if the detected link traffic condition is above a predetermined threshold, limiting fluctuation of the link speed to within a threshold amount of the initial link speed value, resulting in a recently achieved link speed, and periodically re-estimating the recently achieved link speed as an updated link speed value and limiting the fluctuation based on the updated link speed value.

2. The method of claim 1, wherein detecting the link traffic condition comprises detecting repeated transfers of a same section of video.

3. The method of claim 1, wherein detecting the link traffic condition comprises detecting at least one of detecting user equipment mobility or detecting variability of link speed or system loading.

4. The method of claim 1, further comprising:
   detecting, for the link, at least one of a user equipment device type and an application type, wherein the estimating is performed only when at least one of the application type and the user equipment device type corresponds to a predetermined type.

5. The method of claim 4, wherein the estimating is performed only when the application type corresponds to adaptive streaming.

6. The method of claim 1, wherein the limiting the fluctuation comprises establishing a dedicated bearer.

7. The method of claim 6, wherein the establishing of the dedicated bearer comprises policy and charging rules function messaging, wherein at least one maximum bit rate parameter is a fixed percentage above that necessary to provide the initial link speed value.

8. The method of claim 7, wherein the establishing of the dedicated bearer comprises policy and charging rules function messaging, wherein at least one guaranteed bit rate parameter is a fixed percentage below that necessary to provide the initial link speed value.

9. The method of claim 8, wherein at least one of a first threshold amount, a second threshold amount and the fixed percentage amounts depend upon the value of the application type.

10. The method of claim 8, wherein the fixed percentage amount is further decreased in response to detecting repeated transfers of the same section of media in the previous time interval in the presence of the previous fixed percentage amount.

11. The method of claim 7, wherein the establishing of the dedicated bearer comprises policy and charging rules function messaging, wherein
   the guaranteed bit rate parameter and the maximum bit rate parameter are both increased when the recently achieved link speed is within a threshold percentage of the current maximum bit rate parameter
   the guaranteed bit rate parameter and the maximum bit rate parameter are both decreased when the recently achieved link speed is within a threshold percentage of the current guaranteed bit rate parameter.

12. The method of claim 6, wherein the establishing of the dedicated bearer comprises signaling down to a base station indicating that the link corresponds to a special limited variability session whose average link speed is not to change more than a threshold percentage over each given time interval.

13. The method of claim 6, wherein the establishing the dedicated bearer comprises signaling through a policy and charging rules function indicating that the link corresponds to a special limited variability session whose average link speed is not to change more than a threshold percentage over each given time interval.

14. The method of claim 6, wherein the establishing the dedicated bearer comprises signaling through a policy and charging rules function indicating that the link corresponds to a special limited variability session whose quality of service bit rate is to be progressively reduced in a staircase fashion over a next time interval.

15. An apparatus, comprising:
at least one processor; and
at least one memory including computer program code, wherein the at least one memory and the computer program code are configured to, with the at least one processor, cause the apparatus at least to
detect, for a link, a link traffic condition above a predetermined threshold;
estimate link speed to obtain an initial link speed value; and
if the detected link traffic condition is above a predetermined threshold,
limit fluctuation of the link speed to within a threshold amount of the initial link speed value, resulting in a recently achieved link speed, and
periodically re-estimate the recently achieved link speed as an updated link speed value and limit the fluctuation based on the updated link speed value.

16. The apparatus of claim 15, wherein the at least one memory and the computer program code are configured to, with the at least one processor, cause the apparatus at least to detect the link traffic condition by detecting repeated transfers of a same section of video.

17. The apparatus of claim 15, wherein the at least one memory and the computer program code are configured to, with the at least one processor, cause the apparatus at least to detect the link traffic condition by at least one of detecting user equipment mobility or detecting variability of link speed or system loading.

18. The apparatus of claim 15, wherein the at least one memory and the computer program code are further configured to, with the at least one processor, cause the apparatus at least to detect, for the link, at least one of a user equipment device type and an application type, wherein the estimating is performed only when at least one of the application type and the user equipment device type corresponds to a predetermined type.

19. The apparatus of claim 18, wherein the at least one memory and the computer program code are configured to, with the at least one processor, cause the apparatus at least to estimate the link speed only when the application type corresponds to adaptive streaming.

20. An apparatus, comprising:
detecting means for detecting, for a link, a link traffic condition above a predetermined threshold;
estimating means for estimating link speed to obtain an initial link speed value;
limiting means for limiting fluctuation of the link speed to within a threshold amount of the initial link speed value, resulting in a recently achieved link speed, if the detected link traffic condition is above a predetermined threshold; and
updating means for periodically re-estimating the recently achieved link speed as an updated link speed value and limiting the fluctuation based on the updated link speed value.

* * * * *